United States Patent [19]

Wiedermann et al.

[11] 3,909,465

[45] Sept. 30, 1975

[54] PROCESS FOR THE PRODUCTION OF RIGID FOAM RESINS WHICH CONTAIN PREDOMINANTLY ISOCYANURATE RING STRUCTURES

[75] Inventors: Rolf Wiedermann, Bergisch-Gladbach; Johannes Blahak, Cologne; Franz Hermann Prager, Opladen, all of Germany

[73] Assignee: Bayer Aktiengesellschaft, Leverkusen, Germany

[22] Filed: Dec. 28, 1973

[21] Appl. No.: 429,244

[30] Foreign Application Priority Data
Jan. 12, 1973  Germany............................ 2301408

[52] U.S. Cl.................... 260/2.5 AW; 260/2.5 AG; 260/2.5 AM; 260/77.5 AM
[51] Int. Cl.$^2$...................... C08J 9/00; C08G 18/28
[58] Field of Search............. 260/2.5 AW, 77.5 NC, 260/2.5 AM, 77.5 AM, 75 NH

[56] References Cited
UNITED STATES PATENTS

| | | | |
|---|---|---|---|
| 3,256,213 | 6/1966 | Gmitter et al................ | 260/2.5 AW |
| 3,644,232 | 2/1972 | Bernard et al. .............. | 260/2.5 AW |
| 3,660,326 | 5/1972 | Mallabar ...................... | 260/2.5 AM |
| 3,681,290 | 8/1972 | Meckel et al................ | 260/77.5 AM |
| 3,794,621 | 2/1974 | Meckel et al................ | 260/77.5 AM |
| 3,803,064 | 4/1974 | Fishbein et al............... | 260/2.5 AW |
| 3,804,782 | 4/1974 | Demou et al................. | 260/2.5 AW |

OTHER PUBLICATIONS

Chemical Abstracts, Vol. 74, 125086s, Khofbauer et al., (Zh. Prikl. Khim (Leningrad) 1971, 44(3), 699–700.

*Primary Examiner*—H. S. Cockeram
*Attorney, Agent, or Firm*—Joseph C. Gil

[57] ABSTRACT

Rigid foam resins containing isocyanurate ring structures prepared by reacting an aromatic amine containing compounds with the usual polyhydroxyls, polyisocyanates and blowing agents in the presence of a trimerization catalyst which are useful as insulating materials.

3 Claims, No Drawings

PROCESS FOR THE PRODUCTION OF RIGID FOAM RESINS WHICH CONTAIN PREDOMINANTLY ISOCYANURATE RING STRUCTURES

It is known that foam resins which contain isocyanurate ring structures can be produced by reacting organic polyisocyanates in the presence of trimerisation catalysts and blowing agents and, if desired, elasticizing components such as polyols. These foams have excellent resistance to deformation even at temperatures of up to 250°C and much more prolonged resistance to fire than conventional polyurethane foams. One disadvantage of polyisocyanurate foams, however, is that they are liable to form cracks when subject to heat, and these cracks form heat bridges across which occurs a break down of the otherwise high insulating power of polyisocyanurate foams. At the same time, combustible gases can escape through these cracks produced by the heat and thus impair the fire resistance both of compact foams and of composite panels produced from polyisocyanurate foams.

This invention relates to a process for the production of rigid foam resins which contain predominantly isocyanurate ring structures by reacting a polyhydroxyl compound with an aromatic polyisocyanate in the presence of an isocyanate polymerisation catalyst and a blowing agent, which is characterised in that compounds having an aromatically bonded primary or secondary amine group and having a molecular weight of 93 to 5,000 and preferably 150 to 1,200 are used in the reaction in quantities of 0.2 to 20 parts by weight, preferably 0.5 to 10 parts by weight, based on the quantity of polyisocyanate used.

The term, that the rigid foam resins contain predominantly isocyanurate ring structures means that in the rigid foam the structures which derive from the isocyanate group are from 50 to 100 %, preferably
from 50 to 90 %, most preferred
from 60 to 80 % isocyanurate groups.

As used above the expression "aromatically bonded . . . amine group" is meant to define an amino group wherein the nitrogen atom is bonded to at least one carbon atom comprising a part of an aromatic ring, regardless of the composition of the remainder of the molecule. Included within the meaning of this term are simple compounds such as aniline as well as complex compounds such as polymers having molecular weights ranging from several hundred to several thousand and containing but one amine nitrogen atom bonded to an aromatic carbon atom and possibly containing other characterizing or functional groups. For the sake of convenience these compounds are generally referred to hereinafter as aromatic amines.

Aromatic polyisocyanates known per se, e.g. those described by W. Siefgen in Justus Liebigs Annalen der Chemie, 562, pages 75 to 136, can be used as starting components in the process according to the invention, for example phenylene-1,3- and -1,4-diisocyanate, tolylene-2,4- and -2,6-diisocyanates and any mixtures of these isomers, diphenylmethane-2,4'- and/or 4,4'-diisocyanate, naphthylene-1,5-diisocyanate, triphenylmethane-4,4',4''-triisocyanate, polyphenyl-polymethylene-polyisocyanates which can be obtained by aniline-formaldehyde condensation followed by phosgenation and which have been described e.g. in British Pat. Nos. 874,430 and 848,671, perchlorinated aryl polyisocyanates as described e.g. in German Auslegeschrift No. 1,157,601 and polyisocyanates which contain carbodiimide groups as described in German Pat. No. 1,092,007.

The distillation residues from the commercial production of isocyanates, which still contain isocyanate groups, can also be used, if desired as solutions in one or more of the above mentioned polyisocyanates. Any mixtures of the above mentioned polyisocyanates can also be used.

It is generally preferred to use the commercially readily available polyisocyanates, e.g. tolylene-2,4- and -2,6-diisocyanates and any mixtures of these isomers (TDI), polyphenyl-polymethylene-polyisocyanates which can be obtained by aniline-formaldehyde condensation followed by phosgenation (crude MDI), and aromatic polyisocyanates which contain carbodiimide groups, urethane groups, allophanate groups, isocyanurate groups, urea groups or biuret groups (modified polyisocyanates). Monoisocyanates such as phenyl isocyanate or naphthyl isocyanate can also be included (up to about 50 mol percent).

According to the invention, aromatic amines are used in the production of the foams. These are in particular known diamines and polyamines although in principle monoamines can also be used. The aromatic amines used according to the invention must contain primary and/or secondary amino groups. They generally have a molecular weight of 93 to 5,000 and preferably 150 to 1,200 and are used in quantities of 0.2 to 20 parts by weight, preferably 0.5 to 10 parts by weight, based on the quantity of polyisocyanate used. The following are specific examples of such amines: Isobutyl 3,5-diaminobenzoate, 2-ethylhexyl 3,5-diaminobenzoate, isobutyl 4-methyl-3,5-diaminobenzoate, 2-ethylhexyl 4-methyl-3,5-diaminobenzoate, isobutyl 4-chloro-3,5-diaminobenzoate, 2-ethylhexyl 4-chloro-3,5-diaminobenzoate, propyl 2,4-diaminobenzoate, stearyl 2,4-diaminobenzoate, isobutyl 4-aminoanthranilate, 2-ethylhexyl 5-aminoanthranilate, diethyl 4,4'-diamino-diphenylmethane-3,3'-dicarboxylate, diisobutyl 4,4'-diamino-diphenylmethanedicarboxylate, ethyl 4,4'-diamino-diphenylmethane-3-carboxylate, 4,4'-diamino-3,3',5,5'-tetraisopropyl-diphenylmethane, 4,4'-di-β-hydroxylamino-diphenylmethane, 2,4-diamino-3,5-diethyltoluene, diethylene glycol-dianthranilic acid ester, triethylene glycoldianthranilic acid ester, octaethylene glycol-dianthranilic acid ester, polyethylene glycol-dianthranilic acid ester, N-methyldiethanolamine-dianthranilic acid ester and triethanolaminetrianthranilic acid ester.

The amines described in U.S. applications Ser. No. 134,841 filed Apr. 16, 1971, now U.S. Pat. No. 3,818,250 and Ser. No. 339,667 filed Mar. 9, 1973, now U.S. Pat. No. 3,817,940 and the aromatic amines described in the Journal "Die Angewandte Makromolekulare Chemie (26) 1972, 29–45," which are ester group-containing diamines of the diaminobenzoic acid or anthranilic acid series, can also be used in above mentioned Ser. No. 134,841 are disclosed compounds having terminal amino groups and the general formula

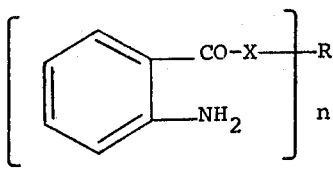

wherein
n is an integer of from 2 to 8,
X is oxygen or sulphur, and
R is an n-valent radical obtained by the removal of hydroxyl groups or mercapto groups from an n-valent polyalkylene ether polyol of molecular weight 600 to 10,000 of from an n-valent alkylene thioether polythiol of molecular weight 600 to 10,000.

These compounds are prepared by reacting polyols with isatoic acid anhydride. Mixed condensates obtained by simultaneous condensation of various anthranilic acid esters with formaldehyde or selective reaction of anthranilic acid esters with aniline, o-chloroaniline, toluidine, N-ethylaniline, 2,6-dialkylanilines or β-hydroxyethyl aniline with formaldehyde are particularly suitable. Special diamines which are alkylated in the nucleus such as tolylene-2,4-diamine and reaction products of tolylene diamine with ethylene oxide and/or propylene oxide are also suitable aromatic diamines for the process of the invention. The amines used according to the invention are preferably completely soluble in the polyhydroxyl compound.

Also suitable are aromatic diamines having the general formula

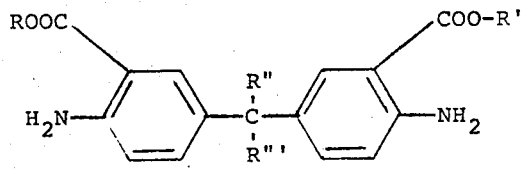

wherein R and R' represent $C_1$–$C_{18}$ alkyl radicals, $C_4$–$C_{14}$ cycloalkyl radicals or $C_6$–$C_{14}$ aryl radicals, R" and R''' represent hydrogen atoms or $C_1$ to $C_6$ alkyl radicals, or the grouping

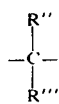

represents $C_4$ to $C_6$ cycloalkyl radicals. These amines can be prepared by condensing compounds having the formula

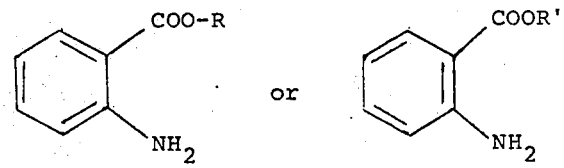

with aldehydes or ketones having the formula

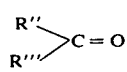

wherein R, R', R" and R''' are as defined hereinabove. The condensation products are then caused to undergo molecular rearrangement by the action of acids at temperatures of from about 40°C to about 130°C.

Compounds which contain at least two hydroxyl groups and preferably have a molecular weight of 62 to 10,000 are also used as starting components according to the invention. These compounds are understood to be, in particular, compounds which contain 2 to 8 hydroxyl groups and especially those which have a molecular weight of 400 to 10,000, preferably 1,000 to 6,000 e.g. polyesters, polyethers, polythioethers, polyacetals, polycarbonates and polyester amides, all of which have at least two and generally 2 to 8 but preferably 2 to 4 hydroxyl groups. These compounds are known for the preparation both of homogeneous and of cellular polyurethanes.

Suitable polyesters with hydroxyl groups are, for example, the reaction products of polyhydric, preferably dihydric alcohols and optionally in addition trihydric alcohols with polybasic, preferably dibasic carboxylic acids. Instead of the free polycarboxylic acids, the corresponding polycarboxylic acid anhydrides or corresponding polycarboxylic acid esters of lower alcohols or mixtures thereof can be used for preparing the polyesters. The polycarboxylic acids used can be aliphatic, cycloaliphatic, aromatic and/or heterocyclic polycarboxylic acids and can be substituted, e.g. with halogen atoms, and/or unsaturated. The following are examples:

Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl-terephthalate and bisglycol terephthalate. Suitable polyhydric alcohols are e.g. ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethyleneglycol, triethyleneglycol, tetraethylene glycol, polyethylene glycols, dipropylene glycol, polypropyleneglycols, dibutylene glycol and polybutylene glycols. The polyesters may contain a certain proportion of terminal carboxyl groups. Polyesters of lactones such as ε-caprolactone or hydroxycarboxylic acids such as ω-hydroxycaproic acid can also be used.

The polyhydric alcohols mentioned above can also themselves be used as polyhydroxyl compounds.

The polyethers used according to the invention which contain at least two and generally 2 to 8, preferably 2 or 3, hydroxyl groups are known polyethers and are prepared e.g. by polymerization of epoxides such as ethylene oxide, propylene oxide, butylene oxide, tetrahydrofuran, styrene oxide or epichlorhydrin each with itself, e.g. in the presence of $BF_3$ or by addition of these epoxides, optionally as mixtures or successively, to starting components which contain reactive hydrogen atoms such as alcohols or amines, e.g. water, ethylene glycol, propylene-1,3- or -1,2-glycol, trimethylolpropane, 4,4'-dihydroxy-diphenylpropane, aniline, ammonia, ethanolamine or ethylene diamine. Sucrose polyethers such as those described e.g. in German Auslegeschrift Nos. 1,176,358 and 1,064,938 can also be used according to the invention. It is frequently preferred to use polyethers which contain predominantly primary OH groups (up to 90% by weight based on all the OH groups present in the polyether). Polyethers which have been modified with vinyl polymers, such as those obtained e.g. by the polymerization of styrene or acrylonitrile in the presence of polyethers (U.S. Pat. Nos. 3,383,351; 3,304,273; 3,523,093 and 3,110,695 and German Pat. No. 1,152,536) and polybutadienes which contain OH groups are also suitable.

Suitable polythioethers are in particular the condensation products of thiodiglycol with itself and/or with other glycols, dicarboxylic acids, formaldehyde, aminocarboxylic acids or aminoalcohols. These products are either polythio mixed ethers, polythio ether esters or polythio ether ester amides, depending on the cocomponent.

Suitable polyacetals are e.g. those which can be obtained from glycols such as diethylene glycol, triethylene glycol, 4,4'-dihydroxyethoxy-diphenyldimethylmethane, hexane-diol and formaldehyde. Polyacetals suitable for the process according to the invention can also be prepared by the polymerization of cyclic acetals.

The hydroxyl polycarbonates used can be those known polycarbonates which can be prepared e.g. by reacting diols such as propane-1,3-diol, butane-1,4-diol and/or hexane-1,6-diol, diethylene glycol, triethylene glycol or tetraethylene glycol with diarylcarbonates, e.g. diphenylcarbonate or with phosgene.

Suitable polyester amides and polyamides are e.g. the predominantly linear condensates obtained from polybasic saturated and unsaturated carboxylic acids or their anhydrides and polyvalent saturated and unsaturated amino alcohols, diamines, polyamines and mixtures thereof.

Polyhydroxyl compounds which already contain urethane or urea groups as well as natural polyols which can be modified, such as castor oil, carbohydrates or starch can also be used. Addition products of alkylene oxides with phenol formaldehyde resins or with urea formladehyde resins are also suitable for the process according to the invention.

The quantity of polyhydroxyl compounds used is generally adjusted so that sufficient free isocyanate groups are still available for the polymerization reaction. The quantity is preferably calculated so that at least 50% and preferably over 70% of the total quantity of isocyanate used is available for the polymerization reaction.

Representatives of these compounds which can be used according to the invention have been described e.g. in High Polymers, Vol. XVI, "Polyurethanes, Chemistry and Technology," by Saunders and Frisch, Interscience Publishers, New York, London, Volume I, 1962, pages 32–42 and pages 44–54 and Volume II, 1964, pages 5–6 and 198–199, and in Kunststoff-Handbuch, Volume VII, Vieweg-Hochtlen, Carl-Hanser-Verlag, Munich, 1966, e.g. on pages 45 to 71.

According to the invention, water and/or readily volatile organic substances are used as blowing agents. Suitable organic blowing agents are e.g. acetone, ethyl acetate, halogenated alkanes such as methylene chloride, chloroform, ethylidene chloride, vinylidene chloride, monofluorotrichloromethane, chlorodifluoromethane or dichlorodifluoromethane, butane, hexane, heptane or diethylether. Compounds which decompose at temperatures above room temperature to liberate gases such as nitrogen, e.g. azo compounds such as azoisobutyric acid nitrile, can also act as blowing agents. Other examples of blowing agents and details of methods of using blowing agents are described in Kunststoff-Handbuch, Volume VII, published by Vieweg and Hochtlen, Carl-Hanser-Verlag, Munich 1966, e.g. on pages 108 and 109, 453 to 455 and 507 to 510.

The catalysts used for the polymerization reactions are compounds which initiate a polymerization reaction of the NCO group at room temperature. Such compounds have been described for example, in French Pat. No. 1,441,565 and in Belgian Pat. Nos. 723,153 and 723,152.

Such catalysts are in particular mononuclear or polynuclear Mannich type bases obtained from condensable phenols which are optionally substituted with alkyl, aryl or aralkyl groups or from oxo compounds and secondary amines, especially those in which the oxo compound used is formaldehyde and the secondary amine used is dimethylamine. According to IR spectroscopic analyses, the foam resins produced generally contain substantial quantities of carbodiimide structures varying according to the conditions, in particular the reaction temperature reached; the proportion of carbodiimide structures in the foams can be increased by using known catalysts which catalize the production of carbodiimide, in particular trivalent to pentavalent organic phosphorus compounds such as phospholines, phospholine oxides, tertiary phosphines, (cyclic) esters, amides and ester amides of phoshorous and phosphoric acid. Further details may be found e.g. in "Polyurethanes, Chemistry and Technology," Volumes I and II, Saunders and Frisch, Interscience Publishers, 1962 and 1964.

The quantity of polymerization catalyst is mainly determined by the nature (and in some cases basicity) of the catalyst and may be between 0.5 and 100% by weight, preferably between 1 and 25% by weight of catalyst component, based on the isocyanate component.

According to the invention, catalysts conventionally used in polyurethane chemistry are often used in addition to the isocyanate polymerization catalysts. These known catalysts of polyurethane chemistry are, e.g. tertiary amines such as triethylamine, tributylamine, N-methyl-morpholine, N-ethyl-morpholine, N-cocomorpholine, N,N,N',N'-tetramethylethylenediamine, 1,4-diazabicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

The following are examples of tertiary amines which contain hydrogen atoms which are reactive with isocyanate groups: Triethanolamine, triisopropanolamine, N-methyl-diethanolamine, N-ethyl-diethanolamine, N,N-dimethylethanolamine, and their reaction products with alkylene oxides such as propylene oxide and/or ethylene oxide.

Silaamines with carbon-silicon bonds such as the compounds described in U.S. Pat. No. 3,620,984 can also be used as catalysts, e.g. 2,2,4-trimethyl-2-silamorpholine or 1,3-diethylaminomethyl-tetramethyl-disiloxane.

Metal-organic compounds can also be used as catalysts according to the invention, especially organic tin compounds.

The organic tin compounds used are preferably tin (II) salts of carboxylic acids such as tin (II) acetate, tin (II) octoate, tin (II) ethyl hexoate and tin (II) laurate and the dialkyl tin salts of carboxylic acids, e.g. dibutyl tin diacetate, dibutyl tin dilaurate, dibutyl tin maleate or dioctyl tin diacetate.

Other examples of catalysts which can be used for the process according to the invention and details of the action of these catalysts are described in Kunststoff-Handbuch, Volume VII, published by Vieweg and Hochtlen, Carl-Hanser-Verlag, Munich 1966, e.g. on pages 96 to 102.

These catalysts are generally used in a quantity of about 0.001 to 10% by weight, based on the quantity of compounds with a molecular weight of 62 to 10,000 which contain at least two hydrogen atoms which are reactive with isocyanates.

Surface active additives (emulsifiers and foam stabilizers) can also be used in the process according to the invention. The emulsifiers used can be e.g. the sodium salts of ricinoleic sulphonic acids or of fatty acids or salts of fatty acids with amines such as oleic acid diethylamine or stearic acid diethanolamine. Alkali metal or ammonium salts of sulphonic acids, e.g. of dodecylbenzene sulphonic acid of dinaphthylmethanedisulphonic acid or of fatty acids such as ricinoleic acid or of polymeric fatty acids can also be used as surface active additives.

The foam stabilizers used are mainly water-soluble polyether siloxanes. The structure of these compounds is generally such that a copolymer of ethylene oxide and propylene oxide is attached to a polydimethyl-siloxane group. Such foam stabilizers have been described e.g. in U.S. Pat. No. 2,764,565.

Reaction retarders can also be used according to the invention, e.g. substances which are acid in reaction such as hydrochloric acid or organic acid halides; known cell regulators such as paraffins or fatty alcohols or dimethylpolysiloxanes can also be used as well as pigments or dyes and flame retarding agents known per se such as tris-chloroethylphosphate or ammonium phosphate and ammonium polyphosphate; other substances which can be added include age resistors and stabilizers against weathering plasticizers, fungistatic and bacteriostatic substances and fillers such as barium sulphate, kieselguhr, carbon black or whiting.

Further examples of surface active additives, foam stabilizers, cell regulating agents, reaction retarders, stabilizers, flame-retarding substances, plasticizers, dyes, fillers and fungistatic and bacteriostatic substances which can be added according to the invention and details of their action and methods of use have been described in Kunststoff-Handbuch, Volume VI, published by Vieweg and Hochtlen, Carl-Hanser-Verlag, Munich 1966, e.g. on pages 103 to 113.

Red phosphorus is preferably used as flame-retarding agent. The quantity of flame-retarding agent added to the reaction mixture for producing the foam, e.g. the quantity of red phosphorus, is calculated so that the reaction mixture contains between 0.5 and 20% by weight, preferably between 2 and 15% by weight and better still between 1 and 7% by weight, based on the total weight of the foamable mixture.

According to the invention, the reactants are reacted together by the known one-step process, prepolymer process or semipropolymer process, often with the aid of mechanical devices, e.g. those described in U.S. Pat. No. 2,764,565. Details concerning processing apparatus which are suitable for the purposes of the invention are described in Kunststoff-Handbuch, Volume VI, published by Vieweg and Hochtlen, Carl-Hanser-Verlag, Munich, 1966, e.g. on pages 121 to 205.

IR spectroscopic investigation of the foam resins obtained shows high proportions of isocyanurate rings in addition to small quantities of carbodiimide groups.

The products of the process can be used e.g. as soundproofing materials, as insulating materials or as constructional materials and in the furniture industry.

TEST METHOD

The prolonged resistance to fire of structural parts made of polyisocyanurate foams is tested in an incendiary chamber test according to DIN 4102. The important criteria are the average increase in temperature (140°C) and maximum temperature increase (180°C) on the side of the foam remote from the fire and the leakage of combustible gases.

The investigations were carried out using an incendiary chamber as prescribed according to DIN 18 082 for testing the quality of mineral fiber inserts in fireproof steel doors. The fire tests carried out on wall sections measuring 500 × 500 × 60 mm give indications of the prolonged resistance to fire of the given construction. Exposure of the wall sections to heat is carried out in accordance with the standard temperature curve of DIN 4102. The average temperature rise on the side remote from the fire is recorded with thermoelectric elements as a function of the exposure time. The maximum temperature rise is detected by means of a movable thermoelectric element.

GENERAL INSTRUCTIONS FOR THE PRODUCTION OF TEST PANELS

100 Parts of a prepolymer of 90 parts of crude 4,4'-diisocyanato-diphenylmethane (obtained by the condensation of aniline and formladehyde followed by phosgenation) and 10 parts of a polyether with OH number 250 prepared from trimethylolpropane and ethylene oxide are mixed with 10 parts of trichlorofluoromethane. The other component is a mixture of 12 parts of a Mannich base (prepared by condensation of 1 mol of nonylphenol, 1 mol of formaldehyde and 1 mol of dimethylamine), 2 parts of the silicone stabilizer L 5320 of Union Carbide Co., 5 parts of trichlorofluoromethane and 1 part of 4-chloro-3,5-diaminobenzoic acid 2-ethylhexyl ester (Formulation 1). The stabilizer (L 5320) is believed to be a polysiloxane-polyalkylene glycol having the average formula:

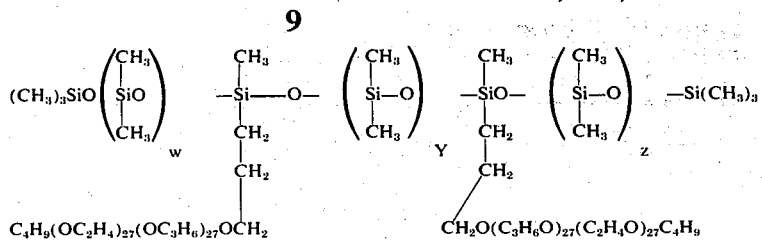

where the sum of $w$, $y$ and $z$ is about 16.

Other formulations shown in the Tables are used in analogous manner.

These two components are dosed and mixed in a foaming apparatus Model HK 100 of Maschinenfabrik Hennecke Gmbh, Birlinghoven. The resulting foam is stored for 1 week and then cut up into panels measuring 50 × 50 × 6 cm to which steel sheets 50 × 50 cm and 0.5 mm in thickness are glued on both sides. These elements are then tested by the method described above.

TABLE 1

Examples: Formulations of isocyanurate foams (1–8) (Comparison: Formulation 9 which is free from amines; aliphatic amine 10). (The parts given are parts by weight)

| Formulation | 1 | 2 | 3 | 4 | 5 | 6 | 7 | 8 | 9 | 10 |
|---|---|---|---|---|---|---|---|---|---|---|
| Mannich base[1] | 12 | 12 | 12 | 12 | 12 | 12 | 12 | 12 | 12 | 12 |
| Stabiliser L 5320 (Union Carbide Co.) polyalkylene glycol-polysiloxane | 2 | 2 | 2 | 2 | 2 | 2 | 2 | 2 | 2 | 2 |
| Trichlorofluoromethane | 5 | 5 | 5 | 5 | 5 | 5 | 5 | 5 | 5 | 5 |
| 4-Chloro-3,5-diamino-benzoic acid-2-ethyl hexylester | | | | | | | | | — | |
| Amine B[2] | | 4 | | | | | | | — | |
| 2,4-Diamino-3,5-ethyl toluene | | | 2 | | | | | | | |
| 4-Chloro-3,5-diamino-benzoic acid isobutylester | | | | 1.5 | | | | | — | |
| 3,5-Diamino-benzoic acid 2-ethylhexylester | | | | | 1 | | | | — | |
| 4-Methyl-3,5-diamino-benzoic acid-2-ethyl-hexyl ester | | | | | | 1.5 | | | | |
| N-Methyl-diethanolamine-dianthranilic acid ester | | | | | | | 2.5 | | | |
| Amine C[3] | | | | | | | | 3 | — | |
| N-Ethyl-cyclohexylamine | | | | | | | | | — | 1.5 |
| Mixture of 90 parts of crude 4,4'-diisocyanate-diphenylmethane and 10 parts of a polyether with OH numbers 250 (see General instructions) | 100 | 100 | 100 | 100 | 100 | 100 | 100 | 100 | 100 | 100 |
| + Trichlorofluoro-methane | 10 | 10 | 10 | 10 | 10 | 10 | 10 | 10 | 10 | 10 |

EOX = ethylene oxide

[1] Mannich base obtained by condensation of isononylphenol, formaldehyde and dimethylamine in the molar ratio of 1:1:1.
[2] Aromatic amine obtained by reacting isatoic acid anhydride with a polyether which has an average molecular weight of 750 and which has been obtained by the addition of propylene oxide and ethylene oxide (50 parts by weight : 50 parts by weight) to dipropylene glycol, as dianthranilic acid ester.
[3] Mixed condensate of    6 parts by weight of anthranilic acid propyl ester
                            6 parts by weight of anthranilic acid ethyl ester
                            1 part by weight of anthranilic acid methyl ester
with formaldehyde to produce a statistical mixture of 4,4'-diamino-diphenylmethane-3,3'-dicarboxylic acid esters.

TABLE 2

| | 1 | 2 | 3 | 4 | 5 | 6 | 7 | 8 | 9 | 10 |
|---|---|---|---|---|---|---|---|---|---|---|
| % of open cells | 8 | 10 | 9 | 8 | 8 | 8 | 8 | 9 | 8 | 8 |
| Unit weight | 42 | 41 | 39 | 43 | 42 | 42 | 39 | 40 | 38 | 37 |
| Average Temperature increase at 140°C(min) in incendiary chamber test | 55 | 47 | 54 | 57 | 51 | 53 | 55 | 59 | 38 | 27 |
| Average temperature increase at 180°C(min) in incendiary chamber test | 55 | 53 | 55 | 56 | 52 | 54 | 55 | 59 | 38 | 17 |

TABLE 2-Continued

| | 1 | 2 | 3 | 4 | 5 | 6 | 7 | 8 | 9 | 10 |
|---|---|---|---|---|---|---|---|---|---|---|
| Formation of cracks (two panels) | 3/6 | 3/6 | 3/6 | 4/6 | 5 | 3/5 | 4/6 | 4/6 | 2 | 3 |

Assessment of the formation of cracks

1 = very severe formation of cracks, gaping cracks
2 = moderate formation of cracks, gaping cracks
3 = slight formation of cracks, gaping cracks
4 = very severe formation of cracks, non-gaping cracks
5 = moderate formation of cracks, non-gaping cracks
6 = slight formation of cracks, non-gaping cracks Example 9: Formulation without amines - Example: aliphatic amine (see Table 1).

We claim:

1. A rigid foam resin comprising predominantly isocyanurate ring structures prepared by a process which comprises reacting an aromatic polyisocyanate in the presence of an isocyanate trimerization catalyst, a blowing agent, and, a polyhydroxyl compound, characterized in that a compound of the formula:

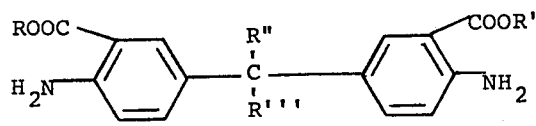

is included in the reaction mixture in a quantity of from about 0.2 to about 20 parts by weight based on 100 parts by weight of polyisocyanate, wherein R and R' represent $C_1$–$C_{18}$ alkyl radicals, $C_4$–$C_{14}$ cycloalkyl radicals, or $C_6$–$C_{14}$ aryl radicals, wherein R'' and R''' represent hydrogen atoms or $C_1$–$C_6$ alkyl radicals or wherein the grouping

represents $C_4$–$C_6$ cycloalkyl radicals, wherein the amount of polyhydroxyl compound used is such that a sufficient quantity of isocyanate groups remain for the trimerization reaction, and wherein from 50 to 100% of said remaining isocyanate groups are polymerized to isocyanurate groups.

2. A rigid foam resin comprising predominantly isocyanurate ring structures prepared by a process which comprises reacting an aromatic polyisocyanate in the presence of an isocyanate trimerization catalyst, a blowing agent, and, a polyhydroxyl compound, characterized in that an alkyl ester of a member selected from the group consisting of: 3,5-diaminobenzoic acid, 4-chloro-3,5-diamino benzoic acid, and 4-methyl-3,5-diamino benzoic acid, is included in the reaction mixture in a quantity of from about 0.2 to about 20 parts by weight based on 100 parts by weight of polyisocyanate, wherein the amount of polyhydroxyl compound used is such that a sufficient quantity of isocyanate groups remain for the trimerization reaction, and wherein from 50 to 100% of said remaining isocyanate groups are polymerized to isocyanurate groups.

3. A rigid foam resin comprising predominantly isocyanurate ring structures prepared by a process which comprises reacting an aromatic polyisocyanate in the presence of an isocyanate trimerization catalyst, a blowing agent, and, a polyhydroxyl compound, characterized in that a (di) alkylated tolylene-2,4-diamine is included in the reaction mixture in a quantity of from about 0.2 to about 20 parts by weight based on 100 parts by weight of polyisocyanate, wherein the amount of polyhydroxyl compound used is such that a sufficient quantity of isocyanate groups remain for the trimerization reaction, and wherein from 50 to 100% of said remaining isocyanate groups are polymerized to isocyanurate groups.

* * * * *